United States Patent [19]

Candiani

[11] 3,789,392

[45] Jan. 29, 1974

[54] BINARY-CODE COMPRESSOR

[75] Inventor: Giampiero Candiani, Milan, Italy

[73] Assignee: Societa Italiana Telecommunicazioni Siemens S.p.A., Milano, Italy

[22] Filed: Sept. 2, 1971

[21] Appl. No.: 177,325

[30] Foreign Application Priority Data

Sept. 15, 1970 Italy .............................. 29740 A/70

[52] U.S. Cl. 340/347 DD, 179/15 BW, 179/15 AV, 235/92 PL

[51] Int. Cl. .............................................. H03r 13/24

[58] Field of Search ... 179/15 AV, 15.55 T, 15 PW; 340/347 DD; 235/154, 155, 92 PL

[56] References Cited

UNITED STATES PATENTS

| | | | |
|---|---|---|---|
| 3,502,806 | 3/1970 | Townsend | 179/15 BW |
| 3,238,298 | 3/1966 | Willis | 178/50 |
| 3,584,145 | 6/1971 | Cutler | 179/15 BW |
| 3,537,073 | 10/1970 | Sakoda | 235/92 PL |
| 3,375,498 | 3/1968 | Scuitto | 235/92 PL |

*Primary Examiner*—Thomas A. Robinson
*Attorney, Agent, or Firm*—Karl F. Ross

[57] ABSTRACT

A 12-bit word, including a polarity of sign bit $Q_s$ and up to seven initial zeroes preceding a group of significant bits, is converted into a compressed eight-bit word which retains the sign bit $Q_s$ in first position and four significant bits X, Y, Z, W in the last positions; the intervening three bits are the binary equivalent of the number of initial zeroes. These intervening bits are generated by a three-stage reverse counter which is loaded by a starting pulse after arrival of the sign bit and is stepped by successive clock pulses, stopping after seven cycles at the count 0 unless cut off earlier by the arrival of the first "one" following the sign bit in the original word. This first "one", or a timing pulse occurring seven cycles after the starting pulse, initiates the stepping of a shift register in which the bits X, Y, Z, W are entered for subsequent transfer to a synthesizing register also receiving the sign bit $Q_s$ and the reading of the reverse counter.

13 Claims, 4 Drawing Figures

Giampiero Candiani
INVENTOR.

BY

Karl F. Ross
Attorney

Giampiero Candiani
INVENTOR.

BY

Karl F. Ross
Attorney

Giampiero Candiani
INVENTOR.
BY
Karl F. Ross
Attorney

| $M_1$ | $M_2$ | $M_3$ | $M_4$ (abc) | $M_5$ | $M_6$ |
|---|---|---|---|---|---|
| I | 0——15 | $a_s$ 0000000XYZW | $a_s$ 000XYZW | $a_s$ 00000000000—$a_s$ 00000001111 | $a_s$ 0000000—$a_s$ 0001111 |
| II | 16——31 | $a_s$ 0000001XYZW | $a_s$ 001XYZW | $a_s$ 00000010000—$a_s$ 00000011111 | $a_s$ 0010000—$a_s$ 0011111 |
| III | 32——63 | $a_s$ 000001XYZW- | $a_s$ 010XYZW | $a_s$ 0000010000——$a_s$ 0000011111- | $a_s$ 0100000—$a_s$ 0101111 |
| IV | 64——127 | $a_s$ 00001XYZW— | $a_s$ 011XYZW | $a_s$ 000010000——$a_s$ 000011111— | $a_s$ 0110000—$a_s$ 0111111 |
| V | 128——255 | $a_s$ 0001XYZW—— | $a_s$ 100XYZW | $a_s$ 00010000——$a_s$ 00011111—— | $a_s$ 1000000—$a_s$ 1001111 |
| VI | 256——511 | $a_s$ 001XYZW—— | $a_s$ 101XYZW | $a_s$ 0010000——$a_s$ 0011111—— | $a_s$ 1010000—$a_s$ 1011111 |
| VII | 512——1023 | $a_s$ 01XYZW—— | $a_s$ 110XYZW | $a_s$ 010000——$a_s$ 011111—— | $a_s$ 1100000—$a_s$ 1101111 |
| VIII | 1024——2047 | $a_s$ 1XYZW—— | $a_s$ 111XYZW | $a_s$ 10000——$a_s$ 11111—— | $a_s$ 1110000—$a_s$ 1111111 |
| | | B | B' | | |

FIG. 4

Giampiero Candiani
INVENTOR.

BY

Karl F. Ross
ATTORNEY

BINARY-CODE COMPRESSOR

My present invention relates to a digital compressor designed to convert an original code word into a compressed code word having a lesser number of bits.

Such compressors, along with complementary expanders, are employed in so-called compander systems serving for the transmission and reception of pulse-code-modulated information, i.e. messages wherein an analog signal (usually a voltage) is translated into its binary equivalent and is subsequently reconstituted from the transmitted code word.

These code words normally have a fixed number ($z$) of bits, the first of them constituting (in the case of a bipolar analog signal) a so-called sign bit indicating only the polarity of the analog signal. With conventional coding, the remaining ($z$−1) bits represent $2^{z-}$ amplitude levels which may be broadly classified in a number of ranges defined by several bits immediately following the sign bit. With a 12-bit code word, for example, the second through eighth bits define eight such ranges which are of equal width on a logarithmic scale but which contain progressively increasing numbers of discrete amplitude levels or quanta established by the bits of lower denominational order. This excessive degree of quantization in the higher ranges could be substantially reduced without materially impairing the signal-to-noise ratio.

The general object of my invention, therefore, is to provide a method of and means for equalizing the quantization in the several ranges, thereby eliminating a considerable number of redundant bits of negligible significance to increase the rate of code-word transmission in a system of given capacity.

A more specific object is to provide a method and a system of this character allowing the compressed word at the receiving end to be readily reconverted into a substantial replica of the original code word, e.g. with the aid of an expander as disclosed in my concurrently filed application Ser. No. 177,307.

These objects are realized, pursuant to the present invention, by counting the number of initial zeroes which precede a group of significant bits and which may immediately follow the usual sign bit. The number $n$ of initial zeroes so counted may range from 0 to ($2^m$ −1), $m$ being a positive integer; in the aforementioned example of a 12-bit word, these zeroes may occupy up to seven consecutive digital positions starting with the No. 2 position, thereby identifying the eight amplitude ranges discussed above ($m$ =3).

The count of these initial zeroes is converted into a binary code combination of $m$ bits, this count being advantageously subtracted from the maximum value of ($2^m$ −1) before digitization so that the resulting $m$-bit code combination gives directly the order number of the corresponding amplitude range.

In a general manner, the constant number $z$ of bits in the original code word may be represented as the sum of the number $n$ of initial zeroes, the number $g$ of significant bits to be preserved, and the number $h$ of insignificant bits to be discarded, augmented in most instances by 1 to allow for the inclusion of the sign bit. As will be apparent hereinafter, the number $h$ of insignificant bits complements the number $n$ of initial zeroes to ($2^m - 2$), dropping to zero for $n = 2^m - 2$ and $n = 2^m - 1$ in the two lowermost amplitude ranges. In the bottom range, $q = q_o = z - 2^m$. Upon shifting from the lowest range to the second-lowest one, the bit in position No. $2^m$ (the eighth position in the aforementioned example) changes from 0 to 1, thereby increasing by 1 the number $q$ of significant bits to be preserved. In all the higher ranges, $q$ remains at this increased value ($q_o + 1$).

The compressed code word produced in accordance with my invention consists of the $q_o$ bits constituting the basic significant group, the $m$ bits representing the count of initial zeroes, and the preceding sign bit (if used). With $q_o = 4$, a 12-bit original code word can thus be reduced to an eight-bit compressed code word.

In order to generate the $m$-bit code group establishing the range classification of the analog signal to be transmitted, I provide a counter (preferably of the reverse or backward-counting type) with $m$ binary stages to which the output of a conventional coder is applied as long as initial zeroes are present in positions No. 2 to No. $2^m$. The counter may be triggered by a flip-flop which is set by a starting pulse from a timer (generated after emission of the sign bit) and is reset by the first finite bit (1) of the sequence of bits following the sign bit, a coincidence of the starting pulse and this first finite bit leaving the flip-flop condition unchanged so that the counter does not operate. If the number of initial zeroes exceeds the value $2^m$ −1, the flip-flop is not tripped before the full count has been reached. The counter then stops automatically at the full count which corresponds to a 0 in each of its stages.

The flip-flop controlling the counter is part of an amplitude-range detector which, in a preferred embodiment, also includes a one-shot pulse generator, such as a monostable circuit (monoflop), which conditions a shift register of ($q_o$ = 1) stages to store the significant bits of the original code word. The pulse generator is tripped either by the first finite bit from the coder or by a marking pulse emanating from the timer in the No. $2^m$ position, whichever comes first. The contents of the shift register and of the counter are transferred to a synthesizer, also in the form of a multistage register, which receives the sign bit directly from the coder and from which the compressed code word of ($1 + m + q_o$) bits may then be read out.

The invention will be described in greater detail hereinafter with reference to the accompanying drawing in which:

FIG. 4 is a table serving to explain the conversion of an original 12-bit code word into a compressed eight-bit code word pursuant to the present invention.

Reference will first be made to FIG. 4 which in column $M_1$ lists eight amplitude ranges I – VIII whose numerical limits (in any convenient units, e.g. millivolts) are given in column $M_2$. According to column $M_3$, each of these ranges can be represented by a generalized 12-bit word including a sign bit $Q_s$ followed by an 11-bit sequence B; each of these words contains a significant group of four consecutive bits X, Y, Z, W preceded, in every range except the first one, by a finite bit 1. In each of the lower ranges I – VII, sequence B also includes one or more initial zeroes ahead of the significant group; in ranges III – VIII, the significant group is followed by one or more insignificant bits symbolized by dashes.

Column $M_4$ shows the compressed code words derived from the original words of column $M_2$, these compressed words being headed by the sign bit $Q_s$ preceding a seven-bit sequence B'. This sequence B' consists of a three-bit code group, varying from 000 to 111, and of the four significant bits X, Y, Z, W of the original sequence B. Column $M_5$ gives the lowest and highest binary values for the generalized code words of column $M_3$; column $M_6$ does the same for the generalized code words of column $M_4$.

It will be noted that the three first bits *a*, *b*, *c* of sequence B' are the binary equivalent of the range classification appearing in column $M_1$. It will also be apparent that the compressed words of column $M_4$ contain all the information of the original words in column $M_3$ with the exception of that conveyed by the insignificant bits.

Figure 1:
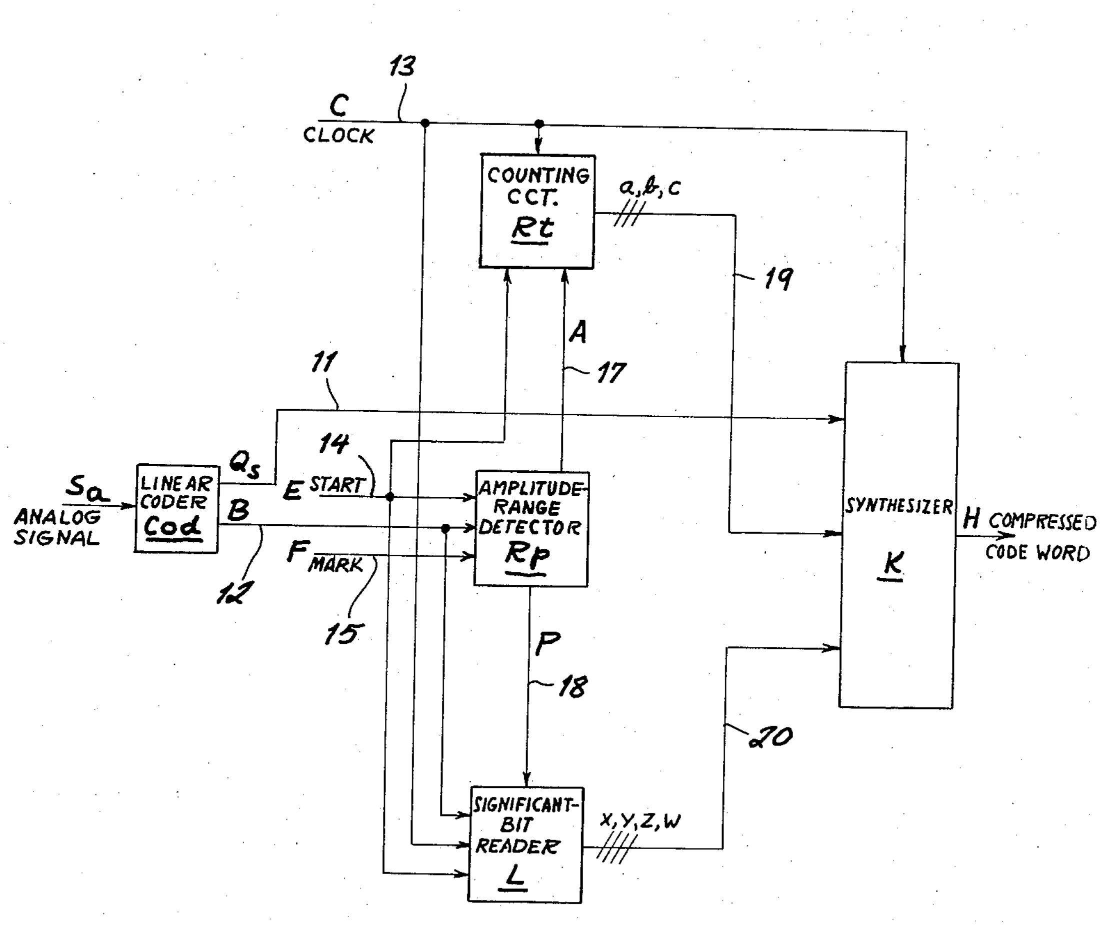
FIG. 1 is an overall block diagram of a code compressor according to the invention.
Figure 2:
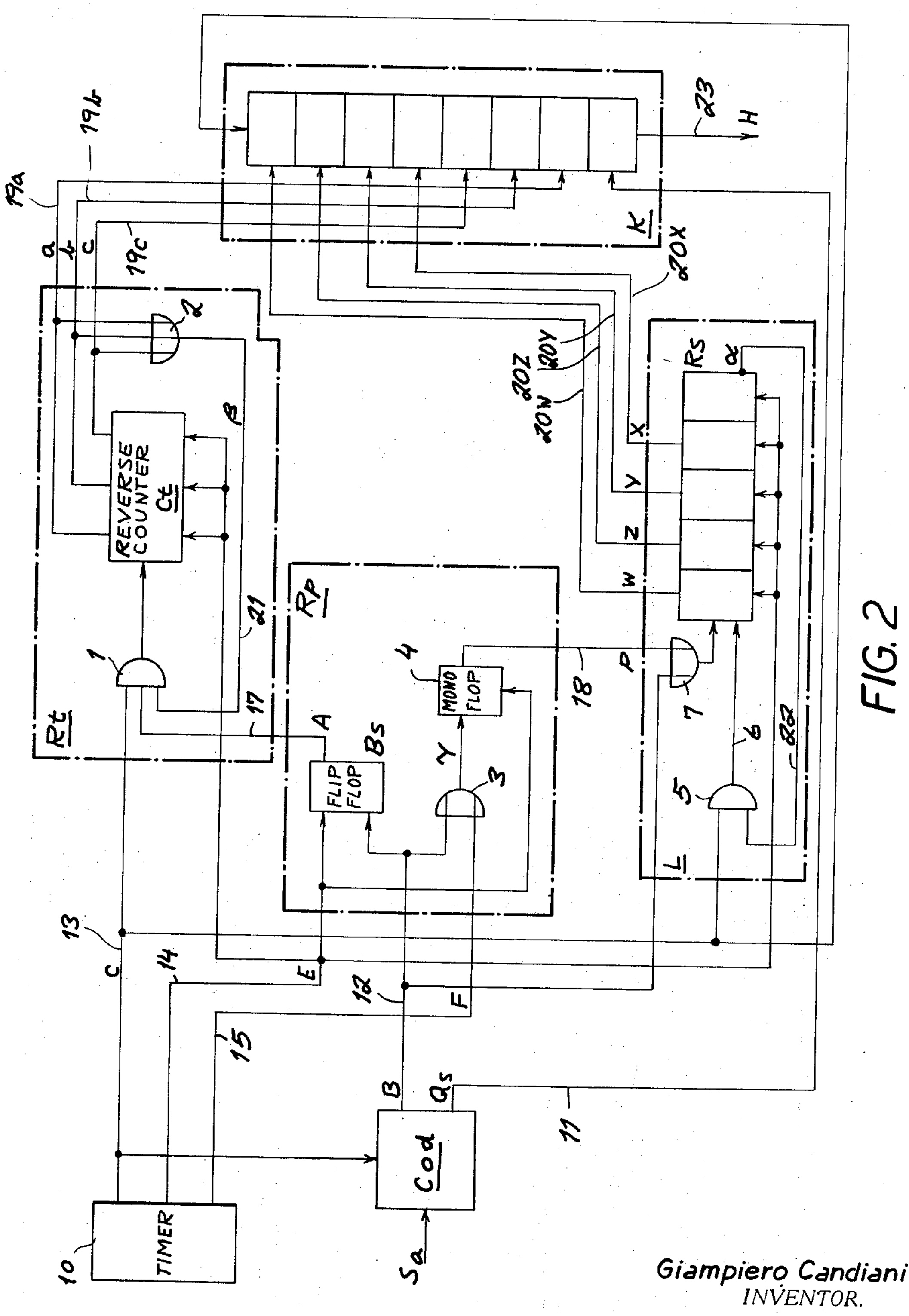
FIG. 2 is a more detailed logic diagram of the system of FIG. 1.
Figure 3:
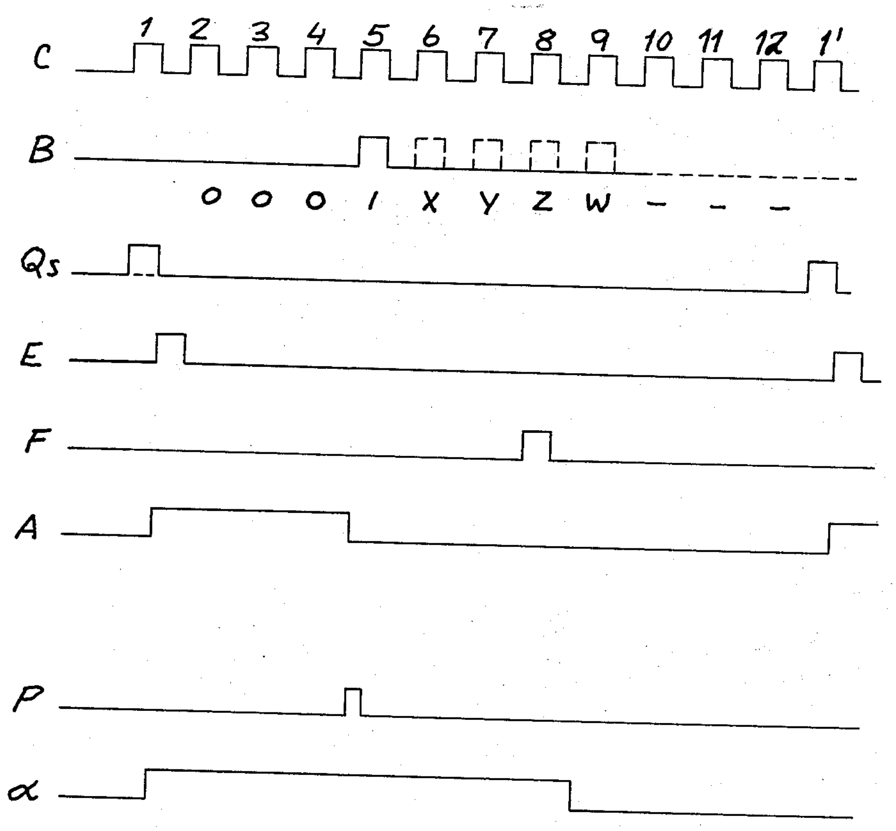
FIG. 3 is a time chart illustrating a variety of pulses generated in the system of FIGS. 1 and 2.

I shall now describe, with reference to FIGS. 1 – 3, a system for carrying out the conversion method outlined above. An analog signal $S_a$ is encoded by a conventional coder *Cod* giving rise to the sign bit $Q_s$ on a first output lead 11 and to the 11-bit sequence B on a second output lead 12. A timer 10 (FIG. 2) generates a train of clock pulses C on a lead 13, a starting pulse E on a lead 14 and a marking pulse F on a lead 15. Leads 13 and 14 extend to a counting circuit R*t* which also receives an enabling signal A over a lead 17 from an amplitude-range detector R*p*. A significant-bit reader L receives the pulses C and E from the timer, the sequence B from the coder and a loading pulse P over a lead 18 from the detector R*p*. Counting circuit R*t* has three stages delivering respective bits *a*, *b* and *c*, via respective leads collectively designated 19, to a synthesizer K also receiving the sign bit $Q_s$ from coder *Cod* by way of lead 11 and the significant bits X, Y, Z, W from respective register stages of reader L over a set of leads collectively designated 20. The output H of synthesizer K represents the compressed code word equivalent to analog signal $S_a$.

FIG. 2 shows the counting circuit R*t* as including a reverse counter C*t* whose stepping input is energizable, in the rhythm of clock pulses C, by way of an AND gate 1 having imputs connected to lead 13, to lead 17 carrying the enabling signal A and to a further lead 21 forming part of a feedback path, this path including an OR gate 2 with three inputs respectively tied to the output leads 19*a*, 19*b*, 19*c* of the several counter stages. Counter C*t* is cleared by starting pulse E on lead 14 terminating at respective loading inputs of its several stages, the appearance of pulse E thus causing the counter to register an initial code combination 111.

Reader L comprises a five-stage shift register R*s* having a stepping input connected by a lead 6 to the output of an AND gate 5, one of the inputs of this gate being connected to lead 13 while the other is tied to an inverting output of the last stage of that register in a feedback loop formed by a lead 22. Normally, a true signal $\alpha$ appears in this output so that the gate 5 passes the clock pulses C to a stepping input 6 of register R*s* as long as the charge of the final stage of that register is zero. An extension of lead 13 passes the clock pulses C to a stepping input of the synthesizer K having the form of an eight-stage shift register. The first stage of this register (as counted from its output end) is connected to output lead 11 of coder *Cod* to receive from it the sign bit $Q_s$. The next three stages of register K are respectively connected to output leads 19*a*, 19*b*, 19*c* for receiving the bits *a*, *b* and *c* stored in the corresponding stages of counter C*t*. The last four stages of register K are similarly connected, via leads 20X, 20Y, 20Z and 20W, to the first four stages of register R*s* for the transfer of bits X, Y, Z and W to the synthesizer. The contents of register R*s*, like those of counter C*t*, are read out in parallel in response to the clearing pulse E; the contents of register K, supplied to its stages in parallel, are read out in series on a line 23 to form the compressed code word H which also includes the sign bit $Q_s$ fed into the terminal just before the read-out. Since the sign of an analog signal normally changes only after a large number of sampling periods, this sign bit may be taken from the next-following sample without significantly altering the information to be conveyed; alternatively, the sign bit may be stored in the coder *Cod* until after the following sequence B has been converted, being then fed into the synthesizer K concurrently with or just before the bits from counter C*t* and register R*s*.

Amplitude-range detector R*p* comprises a flip-flop B*s* with a setting input connected to timer lead 14, a resetting input connected to coder lead 12 and a set output connected to lead 17. This detector also includes a monoflop 4 of the type which must be primed or precharged before it can be tripped, its priming input being tied to conductor 14 whereas its tripping input is connected via an OR gate 3 to leads 12 and 15. Monoflop 4 has its output lead 18 connected, along with a branch of lead 12, via an OR gate 7 to the loading input of shift register R*s*. The off-normal period of monoflop 4 is equal to or less than the width of the clock pulses C so that the loading pulse P emitted by the monoflop should not be wider than a bit.

I shall now describe the operation of the system of FIG. 2, for the conversion of a code word of the type depicted in the fifth row of column $M_3$ in FIG. 4, with reference to FIG. 3 showing the relative time positions of the various pulses discussed above.

Clock pulses C recur at regular intervals, defining successive cycles during which the output of coder *Cod* is read as either 0 or 1. The first clock pulse here illustrated coincides with the sign bit $Q_s$ on lead 11, this bit undergoing no intermediate storage or transformation on its way to synthesizing register K. The sequence B of the code word here considered contains three initial zeroes ahead of the first 1 which is a significant digit introducing the group X, Y, Z, W but forming no part thereof, the digits X, Y, Z, W being followed by three insignificant digits.

Starting pulse 4, pulse generated by the timer just after the clock pulse coinciding with the sign bit $Q_s$, sets the flip-flop B*s* to generate the enabling signal A on its output lead 17. At the priming input of monoflop 4, pulse E charges a capacitance for the subsequent generation of loading pulse P. Pulse E also reaches the clearing inputs of the five stages of shift register R*s* which therefore has an all-zero reading at this point, in contrast to the all-one reading of reverse counter C*t*. With all three inputs of OR gate 2 energized, a true signal $\beta$ is fed to one of the inputs of AND gate 1 which therefore, in the presence of enabling signal A on its second input, passes the clock pulses C on its third input to step the counter C*t*, reducing its count from 111 to 100 after the fourth clock pulse.

In the fifth clock cycle, the appearance of the first finite pulse 1 in sequence B resets the flip-flop B*s* so that enabling signal A is terminated and gate 1 is blocked, thereby arresting the counter C*t*. Signals *a*, *b* and *c* registered by this counter have therefore the respective values 1, 0 and 0 as indicated in the fifth row of column $M_4$ in FIG. 4.

The same finite bit of sequence B passes the OR gate 3 whose output $\gamma$ then trips the monoflop 4 primed by the starting pulse E. The resulting pulse P on lead 18, traversing the OR gate 7 simultaneously with the bit 1 on lead 12, loads the first stage of shift register R*s* which now acquires a finite charge. Any subsequent 1 bit in positions X, Y, Z, W likewise reaches that first register stage but does not again trip the monoflop 4 which is already discharged and is therefore also immune to the marking pulse F appearing in the eighth clock cycle on lead 15.

As long as the last stage of register R*s* remains cleared, the feedback signal $\alpha$ unblocks the AND gate 5 and the register is progressively stepped by successive clock pulses C. At the end of the ninth clock cycle, the charge introduced in the fifth cycle into the first stage of register R*s* has reached its last stage so that signal $\alpha$ disappears and the shifting of register R*s* is stopped. The contents of synthesizer K, i.e. bits $Q_s$, *a*, *b*, *c*, X, Y, Z an W, are read out in that order during the eight cycles beginning with cycle 1′ of the next 12-cycle timer period when the sign bit $Q_s$ is introduced. Thus, the compressed code word H conforms to the one illustrated in row V of column $M_4$ in FIG. 4.

If the code word to be converted had been of the type shown at the top of column $M_3$ in FIG. 4, i.e. if the digitized analog sample had been in the lowest amplitude range I, flip-flop B*s* would not have been reset in the first eight cycles. At the end of the seventh cycle, however, the three counting bits *a*, *b* and *c* would all have been 0 so that the output signal $\beta$ of OR gate 2 would have disappeared with consequent blocking of the passage of clock pulses C through AND gate 1. The tripping pulse $\gamma$ for monoflop 4 would then have been generated in the eighth clock cycle by the application of marking pulse F to OR gate 3.

Conversely, if the analog sample had been in the top amplitude range VIII, starting pulse E would have been followed immediately by a finite bit of sequence B with consequent resetting of the flip-flop B*s* before passage of any clock pulse through the AND gate 1; thus, the output signals *a*, *b* and *c* of counter C*t* would have retained their original value of unity.

To reconvert the compressed eight-bit word into the original 12-bit word prior to reconstitution of the equivalent analog signal therefrom, it is necessary to bear in mind that bits X, Y, Z, W define the quantum level in a range identified by bits *a*, *b*, *c* and that, unless $a = b = c = 0$, this four-bit code group is to be preceded by a 1. In the two bottom ranges, bit W occupies the last digital position of the reexpanded code word; in all other ranges this bit is advantageously followed by a 2, with all subsequent digital positions occupied by 0's, to establish a value midway within the region of uncertainty created by the omission of insignificant digits. Reference may be made to my above-identified copending application for a disclosure of an expander operating in this manner.

Naturally, the principles of my invention are also applicable to code words having a greater or lesser number of bits, e.g. for reduction from 14 bits to 10 ($q_o = 6$) or from 10 bits to six ($q_o = 3$ with omission of sign bit $Q_s$). With $m = 4$, the compression $(2^m - 1 - m)$ amounts to 11 bits instead of four.

I claim:

1. A method of converting a significant part of an original binary code word with a constant number of bits including a group of significant bits preceded by up to $(2^m - 1)$ initial zeroes and followed by up to $(2^m - 2)$ insignificant bits, m being a constant greater than 1, into a compressed code word having a lesser number of bits than the original code word, comprising the steps of:

a. counting the number of said initial zeroes in the original code word;

b. translating said number n into an *m*-bit code combination; and c. constituting the compressed code word from a number of bits including said *m*-bit code combination and said group of significant bits with omission of said insignificant bits.

2. A method as defined in claim 1 wherein the original code word includes a sign bit ahead of said initial zeroes, said sign bit being transferred to the compressed code word.

3. A method as defined in claim 2 wherein said *m*-bit combination is inserted in the compressed code word between said sign bit and said group of significant bits.

4. A method as defined in claim 1 wherein said number *n* is subtracted in step *b* from the value $(2^m - 1)$, with conversion of the difference into said *m*-bit code combination.

5. A system for converting a significant part of an original binary code word into a compressed code word having a lesser number of bits, comprising:

timing means generating a succession of clock pulses;

coding means having an output successively emitting the bits of said original code word in the rhythm of said clock pulses;

counting means with m binary stages connected to said output for registering a count representing a number of up to $(2^m - 1)$ initial zeroes in said original word;

detecting means connected to said output and to said counting means for stopping the latter in response to a first finite bit arriving before attainment of the full count;

storage means connected to said output and jointly controlled by said timing means and said detecting means for registering a predetermined number of significant bits in said original code word occurring immediately upon the stopping of said counting means; and synthesizing means connected to said storage means and to said counting means for receiving therefrom, respectively, said significant bits and an *m*-bit code combination representing said count.

6. A system as defined in claim 5 wherein said counting means comprises a reverse counter connected to be cleared by a starting pulse from said timing means.

7. A system as defined in claim 6 wherein said detecting means comprises a flip-flop with a setting input connected to said timing means for energization by said starting pulse and with a resetting input connected to said coding means for energization by said first finite bit.

8. A system as defined in claim 7 wherein said reverse counter is provided with an input circuit including a coincidence gate, connected to said flip-flop, and with a feedback path terminating at said coincidence gate for blocking same upon attainment of said full count.

9. A system as defined in claim 8 wherein said feedback path comprises an OR gate with input connections to said m binary stages.

10. A system as defined in claim 5, further comprising a direct connection from said output to said synthesizing means for transferring to the latter a sign bit preceding said initial zeroes.

11. A system as defined in claim 5 wherein said storage means comprises a shift register connected to be normally stepped by said clock pulses.

12. A system as defined in claim 11 wherein said shift register has a number of stages exceeding by one the number of significant bits to be transferred to said synthesizing means, said detecting means comprising a pulse generator alternatively responsive to said first finite bit and to a marking pulse from said timing means for introducing a finite bit into the first stage of said shift register, the latter being provided with a feedback connection for halting the stepping thereof upon arrival of said finite bit in the last of its stages.

13. A system as defined in claim 12 wherein said pulse generator comprises a one-shot monoflop connected to said timing means for precharging by a starting pulse and tripping by said marking pulse, said counting means and said said shift register being connected to said timing means for clearing by said starting pulse.

* * * * *